Dec. 2, 1947.  F. BAUER  2,431,725
BREAD PAN GREASING DEVICE
Filed Jan. 10, 1945  2 Sheets-Sheet 1
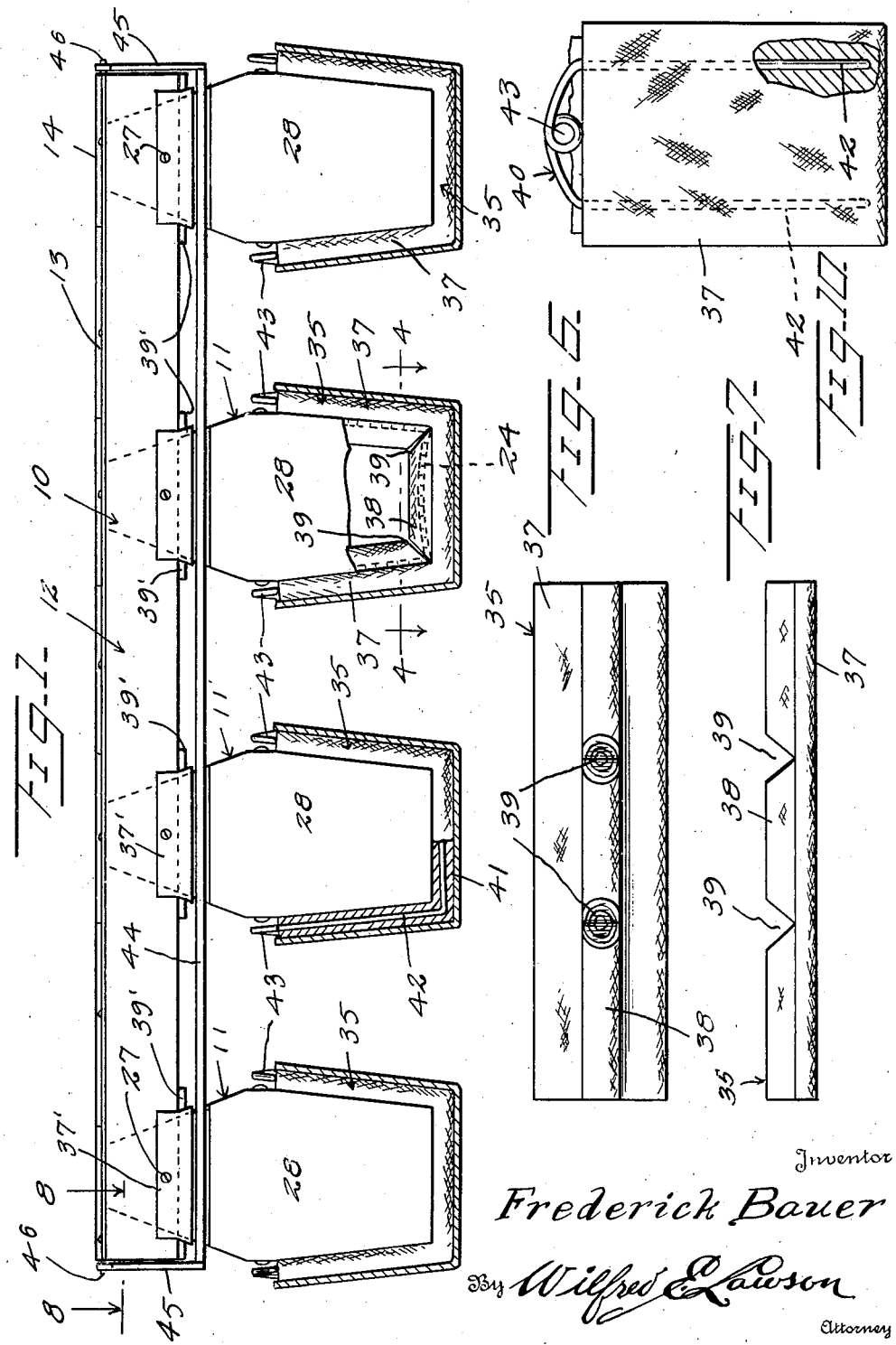
Inventor
Frederick Bauer
By Wilfred E. Lawson
Attorney

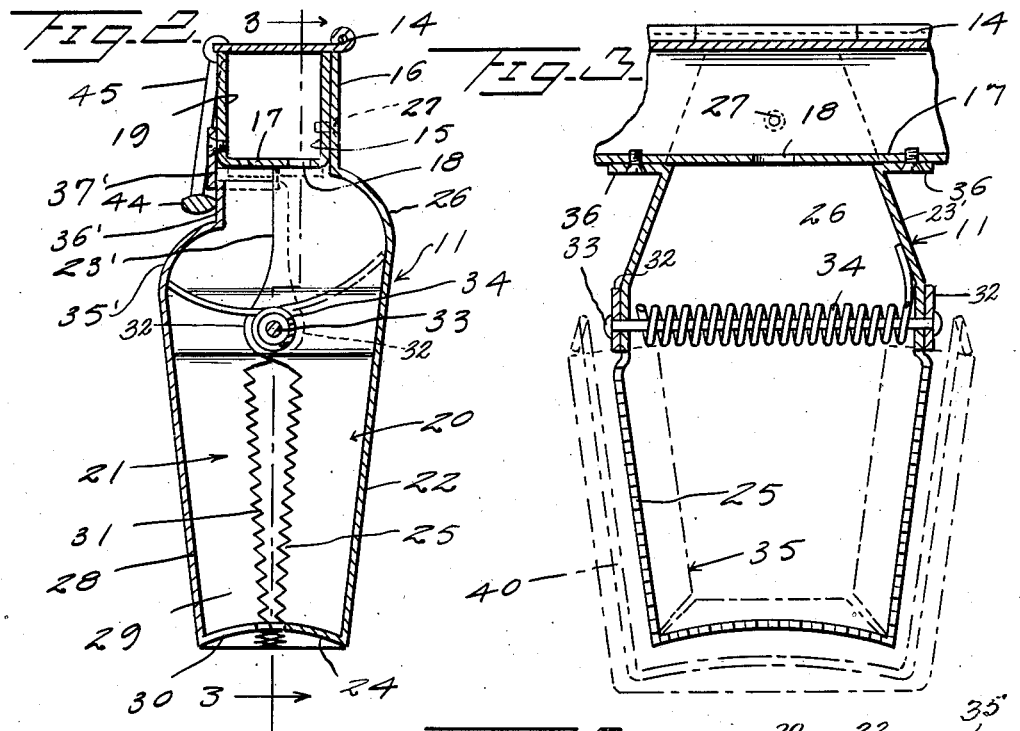

Patented Dec. 2, 1947

2,431,725

UNITED STATES PATENT OFFICE 2,431,725

BREAD PAN GREASING DEVICE

Frederick Bauer, Wausau, Wis.

Application January 10, 1945, Serial No. 572,174

7 Claims. (Cl. 91—39)

This invention relates generally to devices for use in bakeries or other places where baking receptacles have to be greased before the introduction thereinto of the material to be baked and it is a primary object of the present invention to provide a device for facilitating the application of grease to the bottom, side and end walls of a baking pan or similar receptacle.

Another object of the invention is to provide a device designed to facilitate the quick and thorough greasing, at one time, of a number of bread molds or pans when connected together in groups in the manner in which they are commonly used in bakeries, thus doing away with the tedious and time consuming practice of greasing each of the pans individually by hand.

Still another object of the invention is to provide a novel device for facilitating the greasing of a number of pans in a unit, in which the individual greasing pads are formed and secured to the device in a novel manner.

A still further object of the invention is to provide a device for facilitating the greasing of a bread pan or mold, in which a novel means is provided for supplying grease to the greasing pad held in a securing device which carries or is attached to a handle of novel design which may be opened up to receive grease which is fed through the pad holding device to the pad.

A still further object of the invention is to provide a novel device designed to facilitate the greasing of a plurality of pans, which comprises a relatively long handle member and a series of hollow, two-part grease carrying clips, corresponding in number to the pans of a group, connected to the handle, with greasing pads formed in a novel manner and each secured by a clip in proper position to facilitate the greasing simultaneously of the bottom and two side walls of a pan when the clip is placed therein and moved lengthwise therethrough, one end wall being greased in the process of putting the clip into the pan and the opposite end wall being greased in taking the clip out.

Another object of the invention is to provide a pan greasing device having a hollow grease carrying clip which is formed in two parts, and a separable pad formed in a novel manner and maintained in position between the two parts of the clip to be continuously supplied with grease from the clip.

A still further object of the invention is to provide in a device of the character above described, a novel means associated with a carrying handle for the clip, whereby the two parts of the clip may be separated slightly while the greasing pad is in a pan, to permit additional grease to escape onto the pad.

A still further object of the invention is to provide in a device of the character stated, a novel spring holding means for the greasing pad whereby the pad will be maintained in desired form so that contact will be had at all times between the walls of a pan in which the device is placed, and the greasing pad.

The invention will be best understood from a consideration of the following detailed description, taken in connection with the accompanying drawing forming a part of the specification, with the understanding, however, that the invention is not confined to a strict conformity with the showing of the drawing but may be changed or modified so long as such changes or modifications mark no material departure from the salient features of the invention as expressed in the appended claims.

In the drawings:

Figure 1, is a view in side elevation of a pan greaser constructed in accordance with the present invention and designed for the greasing of a number of pans, a portion of the structure being in section and broken away, the greasers being shown in pans which are in cross section.

Figure 2, is a view in transverse section through the device and through one of the greasers, with the greasing pad removed.

Figure 3, is a sectional view taken substantially upon the line 3—3 of Figure 2, showing the position of the greasing pad in broken lines.

Figure 4, is a sectional view taken on the line 4—4 of Figure 1.

Figure 5, is a view in end elevation of the device minus the greasing pads.

Figure 6, is a view in plan of a greasing pad before the application of the spreader spring and the folding of the pad to the proper shape for application to the clips.

Figure 7, is a view in side elevation of the pad as shown in Figure 6.

Figure 8, is a view in side elevation of the spring used in connection with a greasing pad.

Figure 9, is a view in plan of the movement limiting stop unit for the pivoted half or portion of a clip.

Figure 10, is a view showing one side of the greasing pad applied to a clip, a portion of the pad being broken away.

Referring now more particularly to the drawings, the reference character 10 generally designates the handle of the present device while the greasing pad holding or securing clip is designated 11.

In bakeries, bread pans or molds are usually secured together in groups of four and such groups are handled as a unit. The present practice in connection with the greasing of these pans is either to grease each pan individually by hand or effect the greasing operation by a special type of machine. Since such pan greasing machines are relatively expensive, smaller bakeries use the hand greasing method and this is tedious and time consuming.

The device of the present invention is illustrated as having a single relatively long handle unit 10 and four clips 11 attached thereto. However, it is to be understood that the invention is not limited to the specific number of clips shown as it will be readily obvious that one clip may be attached to a handle of suitable length or any number may be applied thereto.

An essential requisite in connection with the construction of the present device, particularly where the device is made with a plurality of greasing pad holding clips 11, is that it be constructed of material of the minimum weight permissible without sacrificing strength or efficiency. Except for this requirement the device may be constructed of any material available and satisfactory.

Since each of the clips 11 is of the same construction as the others the description will be confined to one clip only, it being understood that all of the other clips are of like construction and therefore corresponding numerals will apply.

In accordance with the present invention the handle unit comprises the relatively long hollow or trough-like body portion 12, and the top cover or lid portion 13. The handle is generally of square cross section but preferably has the corners rounded so that it will not hurt or cramp the hand. The top or cover 13 for the hollow handle is hingedly joined as at 14 to the top edge of the side wall 15, which may be referred to as the back wall of the handle or to the top edges of certain upwardly extending plate members 16 which form an integral part of one of the two halves of a clip member 11 as hereinafter more fully described.

The bottom wall 17 of the handle body is provided with grease discharge openings 18 at the necessary spaced intervals for discharge downwardly into the hollow clips 11, as hereinafter described, and the other side wall of the handle, designated 19, has the top wall or cover 13 resting thereon, when closed.

The greasing pad holding clip 11 is of hollow or shell-like form and is of an over-all height materially greater than the height or depth of the pan into which it is introduced. The clip is also of greater width than thickness and is attached to the handle so that the width of the clip extends lengthwise of the handle and consequently, when the greaser is used, the handle will extend across the top of the pan and the greaser pad, hereinafter described, which is carried by the clip, may be moved lengthwise of and within the pan.

The width of the clip decreases or tapers downwardly so that the clip will substantially conform to the tapered form of the pan or bread mold.

As previously stated the clip is formed in two sections and these are designated 20 and 21, the section 20 being fixed to the handle against movement relative thereto, while the section 21 is movable to facilitate the gripping of the greasing pad between the sections.

The section 20 of the clips, comprises the relatively wide side wall 22 and the jaw forming side and bottom flanges 23 and 24 respectively which are toothed or serrated as indicated at 25.

At its top, the wall 22 curves inwardly to form the shoulder 26 and this merges into and is formed integral with the previously referred to plate 16 which is secured against the outer side of the back wall 15 of the handle in a suitable manner, as, for example, by the use of screws 27.

Each of the side flanges 23 is of increased width at its upper or top end to form a wing 23' which extends part way across the width of the handle.

The opposite jaw section 21 has a corresponding relatively wide side wall 28 which is bordered by the side and bottom flanges 29 and 30 respectively and these flanges are also toothed or serrated as indicated at 31 for co-action with the teeth 25.

The teeth 25 of the side flanges 23 and the teeth 31 of the side flanges 29 extend only part way up through the height of the clip. The extent of the teeth through the height of the clip substantially corresponds to the inside depth of the pan into which the clip is extended.

At the upper end of each row of teeth 31 in the side flanges 29, such flanges are extended to form the hinge ears 32. These ears overlie the adjacent wings 23' and are pivotally attached to such wings by the shaft 33 which passes through the wings and the hinge ears and may be secured to one or the other or may be freely rotatable in both as desired.

Within the shell-like body forming the clip, the shaft 33 carries a relatively strong coil spring 34, one end of which bears against the upper part of the wall 22 while the other end bears against the other wall 28. The ends of the spring press outwardly against the two sections of the clip above the pivot shaft 33, and thus cause them to oscillate so as to bring the toothed jaw forming flanges 23—24 and 29—30, together in gripping relation.

The upper part of the wall 28 has an inwardly curving portion or shoulder 35' corresponding to the shoulder 26 and at its inner edge this shoulder joins the short vertical wall portion 36' which lies below the bottom wall 17 of the handle and moves inwardly across such bottom wall when the section 21 of the clip is oscillated on the pivot 33.

Secured to the outer side of the front wall 19 of the handle and extending downwardly below the bottom wall 17 and below the top edge of the wall portion 36', is a plate 37' and at each end of this plate is formed the inwardly extending wing 38', the top edge of which abuts the underside of the bottom wall 17. These wings extend inwardly beyond the edges of the wing portion 23' and cooperate with the plate 37' to close the space between the top edge of the oscillatable section 21 and the underside of the handle. The outer side of the wall portion 36' also abuts the inner side of the plate 37' as shown in Figure 2 thereby forming a relatively tight joint.

While the unit made up of the plate 37' and wings 38' may be secured to the handle in any suitable manner, the means here illustrated comprises the two ears 39', each of which forms an integral part of a wing 38', which are secured by screws or the like to the bottom wall of the handle.

The greasing pad, generally designated 35, is secured to the clip to extend across the bottom and up the sides thereof and such pad comprises initially a relatively long strip of felt or soft cloth, or other suitable material, which is made in sufficient length so that when it is bent transversely at two places to form a U, and is placed in position for connection with the clip, a portion of each of the sides of the U will extend along the opposite sides of the clip while the intermediate portion will extend across the bottom and the pad will be of sufficient width to cover the side and bottom flanges of the clip sections. In addition to covering the flanges of such sections the pad will extend slightly beyond the front and rear faces of the clip so that when the clip is introduced into a pan, the full width of the pan bottom and the full height of each side wall will be contacted by a part of the pad. Thus when the clip and the attached pad are moved through the length of the pan, these inner surfaces of the pan will be completely greased and since the width of the pad will be greater than the thickness of the clip, as stated, it will be seen that each side edge of the horizontal or middle section of the pad may be readily made to contact the inner walls of the pan ends to grease the latter as the pad is moved vertically in the process of inserting and removing the greasing device.

In order to further establish a secure or rigid connection between the clip as a whole and the handle, the fixed section 20 has the laterally extending attaching ears 36, formed integral with the top edges of the wing portion 23' and these are secured to the underside of the bottom wall 17 of the handle as best seen in Figures 3 and 5.

The greasing pad or wad 35 may be formed by rolling a piece of suitable material and then flattening this piece of material and gathering up a portion thereof upon one side and extending longitudinally of the center, so that in its initial form and before it is bent for attachment to the clip it will appear as illustrated in Figures 6 and 7.

As thus formed it will comprise a long flat body portion 37 and a central rib member 38 and the width of the body is greater than the thickness of the clip so that when the rib is grasped, after bending the body to a U shape, between the toothed jaws of the units, the side edges of the body will extend beyond the flat sides of the clip as shown in Figure 4 for effective contact with the pan walls, particularly the end walls.

In order to facilitate the bending of the pad after the central rib 38 is formed, such rib is cut out transversely as indicated at 39. As will be readily apparent the provision of the V-shaped cut 39 allows the rib to be bent so that the completed pad may assume the U shape in which it is shown on Figure 1.

When the pad is bent into the U-shape, the jaws of the clip are separated by pressing inwardly on the shoulder 35' or the top of the jaw section 21 so as to oscillate the lower end of this section away from the lower end of the opposite section and the rib 38 along the bottom part of the U-shaped pad and the portion thereof along the upright sides of the pad are introduced between the jaws so that when the jaws are allowed to close under the action of the spring 34 the rib in the three parts or sections thereof, will be securely gripped between the jaws and the wide portion of the pad will cover the narrow sides and the bottom of the clip.

In order that the pad 35 may be held at its full width along the bottom and the two narrower sides of the clip, there is provided a spreader spring which is shown particularly in Figure 8 and is generally designated 40. This spring is preferably formed from a single length of spring wire and comprises two parallel longitudinally arcuate bottom portions 41, each of which merges with a nearly right angularly extending leg 42. The legs 42 of one U-shaped member of the spring are joined with the adjacent legs of the other member by the spring loop 43. As will be readily apparent from the showing of Figure 8, the arcuate formation of the bottom part 41 of each spring portion throws the upper ends of the legs 42 outwardly or apart and in addition the spring loops 43 are biased so as to spread the lower portions 41 of the two parts of the spring thus causing the legs of one portion of converge with the legs of the adjacent portion.

Before bending the greasing pad to the desired U-shape in order to apply it to a clip the spring unit 40 is extended through the center of the pad until it is entirely enclosed therein except for portions of the spring loops 43, as shown in Figure 3. The pad will thus naturally be caused to assume a U-shape by reason of the form of the spring and since the space between the base and legs 41—42 of one portion of the spring and the opposite portion is greater than the outside width of the pad, the spring will have to be placed under some tension by forcing the two U-shaped side portions together in order to extend it through the pad. As a result of this it will be seen that when the pad is ready for installation upon a clip the spring unit 40 will act to maintain the body portion 37 at its maximum width. When inserting the rib portion 38 of the pad between the jaws of the clip, the sides of the spring unit will have to be flexed inwardly slightly and this will tend to straighten out the portions 41 to some extent. The combined action of the several portions of the spring unit will be to not only hold the bottom and sides of the pad drawn out flat but it will also shape the pad so that it will fit closely in the corners of the pan and the desired full greasing effect will be obtained.

In using the device the clips and the handle are filled with grease after the pads have been applied to the clips in the manner illustrated in Figure 1. The handle provides an additional reservoir for the grease after the clips have been filled and as the grease is absorbed by the pads and distributed therethrough to the surface of the pans, the grease in the handle will flow into the clips through the openings 18.

It will, of course, be apparent that the jaws of the clips will grip the rib portion of each pad very tightly so that the absorption of the grease by the pad and its removal from the clip will not proceed with any great degree of rapidity.

It may be desirable to increase the flow of grease from the clip to and through the pad and in order to obtain this action there is provided a press bar 44 which is disposed transversely of the wall plates 36' of each clip and supported for oscillation so that when pressed inwardly toward the adjacent wall plates 36' the movable sections 21 may be opened slightly so as to allow more grease to flow out.

While any desirable means may be provided for movably supporting the press bar 44 it is preferred that this bar be connected at each end with a hanger arm 45 which will be pivotally connected at its free end with a pivot pin 46 extending from one end of the handle top plate or cover 13. Thus it will be seen, upon reference to Figure 1, that the press bar 44 extends the full length of the handle and that the supporting arms 45 extend upwardly along the outer ends of the handle and are connected with the pivot pins 46 carried by the movable top. If desired, the arms 45 may be pivotally attached to the end walls of the handle so that the top may be moved independently of the arms and the press bar 44.

It will be seen from the foregoing that the construction of the device is such as to continuously supply the greasing pads with grease so that the device may be used for a considerable period of time after the clip and the hollow handle have been filled with grease.

The device of the present invention may be used before filling the clips with grease and before greasing the pads, to wipe or clean out the pan preparatory to the greasing operation.

Since some little time is required for the grease to soak through the greasing pad, it is necessary that, in starting the greasing operation, particularly where pads are used which have not previously been used and are not greasy, to soak the pads or wads thoroughly in the grease or to apply grease to the outsides of the pads. After the greasing pads or wads have become well greased or soaked with grease they will be kept in this condition by being supplied with grease from the inside of the clips to which they are attached.

In the use of the device the grease will flow out from the top part of the clip so that the outer edges of the wad or pad will receive the grease. The grease escapes from the top part of the clip around the joint between the clip sections, where the shaft 33 is connected with the sides of the sections. Because of this it will be readily seen that the major portion of the grease will be applied to the sides of the pans at the top thereof and even though very little grease may actually be applied by the wads to the bottom of the pans, the bottoms will, nevertheless, be well greased because the grease applied generously to the pan walls will flow down and across the bottoms of the pans.

I claim:

1. A pan greaser comprising a hollow shell-like body formed in two relatively flat parts, each of said parts having bordering side flanges and a flange across one end edge, said parts being arranged with the flanges of one part in edge-opposed relation with the flanges of the other part, a pivotal coupling between the body parts facilitating the relative movement of the flanges of the two parts to function as gripping jaws, resilient means connecting between the two parts and normally urging the flanges together, a handle attached to one of said parts at the end thereof opposite from the flanged end, the said jaw forming flanges being designed to grip a grease absorbent body therebetween.

2. A pan greaser of the character stated in claim 1, in which said handle is hollow and is formed in two parts one only of which is directly attached to a part of the body, the handle having an opening to facilitate the passage of grease therefrom into the first body, and the other part of the handle forming a closure for the handle.

3. A pan greaser, comprising a clip formed in two relatively movable parts, adjacent portions of said clip parts functioning as gripping jaws, said gripping jaws being substantially U-shaped, resilient means normally urging said gripping jaws together, a handle attached to one of said clip parts, and a substantially U-shaped absorbent member substantially conforming to the U-shape of said jaws and having a rib throughout the inner side thereof, the said rib of the absorbent member being gripped between said jaws.

4. A pan greaser, comprising a clip formed in two relatively movable parts, adjacent portions of said clip parts functioning as gripping jaws, said gripping jaws being substantially U-shaped, resilient means normally urging said gripping jaws together, a handle attached to one of said clip parts, a substantially U-shaped absorbent member comprising a portion of a width materially greater than the thickness of the clip and a rib extending through the inner side of said portion, the said rib being gripped between the jaws and the wide portion of the member being disposed across the bottom and sides of the clip, and a spring means within the absorbent member and normally functioning to maintain the first named portion of such member at its maximum width.

5. A pan greaser of the character set forth, comprising a body designed for introduction into a pan and shaped to generally conform to the cross sectional contour thereof, said body being formed in two connected relatively movable parts, the parts having opposing portions forming jaws, a handle attached to one of said parts, an absorbent grease applying element removably secured between said jaws, said body being of hollow form and adapted to provide a grease receptacle from which the grease escapes through the absorbent element, means for introducing grease into the body through the top thereof, and said handle being formed with a movable portion adapted to close said means by which grease is introduced into the body.

6. A pan greaser of the character stated, comprising a relatively long body having a portion of a width substantially equal to the inside width of a pan and shaped to generally conform to the inside cross sectional contour of the pan, the body having a thickness materially less than its width and being divided in a plane passing longitudinally between the wide sides thereof to form two portions, means pivotally coupling said portions together for relative movement, a handle attached to one of said portions, a grease absorbent element removably secured between the portions at the end of the body on the side of the pivotal means opposite from the handle, the said body having an opening in its top for the introduction of grease thereinto, and said handle comprising a relatively long hollow body having a movable top for facilitating filling the body, the handle body having openings leading into the first mentioned body.

7. A pan greaser of the character stated, comprising a relatively long body having a portion of a width substantially equal to the inside width of a pan and shaped to generally conform to the inside cross sectional contour of the pan, the body having a thickness materially less than its width and being divided in a plane passing longitudinally between the wide sides thereof to form two portions, means pivotally coupling said portions together for relative movement, a handle attached to one of said portions, a grease absorbent body removably secured between the portions at the end of the body on the side of the pivotal means opposite from the handle, and means pivotally attached to the handle and engaging the other one of said portions above the pivotal coupling between the portions, to function when oscillated in one direction to effect the oscillation of the said other one of the two portions of the body.

FREDERICK BAUER.

REFERENCES CITED

The following references are of record in the file of this patent:

UNITED STATES PATENTS

| Number | Name | Date |
| --- | --- | --- |
| 1,626,991 | Weber | May 3, 1927 |
| 2,174,393 | Steele | Sept. 26, 1939 |
| 2,267,491 | Burkhart | Dec. 23, 1941 |
| 595,910 | Fili | Dec. 21, 1897 |
| 1,168,291 | Dengler | Jan. 18, 1916 |